US012596074B2

(12) United States Patent
Numata

(10) Patent No.: US 12,596,074 B2
(45) Date of Patent: Apr. 7, 2026

(54) CAMERA SYSTEM

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 390 days.

(21) Appl. No.: 17/823,141

(22) Filed: Aug. 30, 2022

(65) Prior Publication Data

US 2023/0108490 A1     Apr. 6, 2023

(30) Foreign Application Priority Data

Oct. 6, 2021     (JP) ................................. 2021-164443

(51) Int. Cl.
*G01N 21/88*         (2006.01)
*G01N 21/3581*     (2014.01)
        (Continued)

(52) U.S. Cl.
CPC ..... *G01N 21/8806* (2013.01); *G01N 21/3581* (2013.01); *G06T 7/70* (2017.01); *H04N 23/56* (2023.01)

(58) Field of Classification Search
CPC ........... G01N 21/8806; G01N 21/3581; G01N 2021/8816; G06T 7/70; H04N 23/56
See application file for complete search history.

(56) References Cited

U.S. PATENT DOCUMENTS 6,850,637 B1 *   2/2005   Burnett .............. G01N 21/8806
                                                            250/559.08
11,621,788 B2 *   4/2023   Sato ..................... H04B 10/071
                                                            398/140

(Continued)

FOREIGN PATENT DOCUMENTS

JP         2016009778 A   *   1/2016
JP         2020-153973 A       9/2020
JP         2020-153974 A       9/2020

OTHER PUBLICATIONS

U.S. Appl. No. 17/955,691, filed Sep. 29, 2022, by Aihiko Numata.
(Continued)

*Primary Examiner* — Kara E. Geisel
*Assistant Examiner* — Christina I Xing
(74) *Attorney, Agent, or Firm* — VENABLE LLP

(57)     ABSTRACT

A camera system configured to inspect an inspection target moving in a first direction includes an illumination unit configured to irradiate the inspection target with a terahertz wave, and a camera unit disposed at a position which the terahertz wave reflected on the inspection target enters, and configured to acquire an image formed by the reflected terahertz wave. The illumination unit includes a plurality of illumination elements two-dimensionally arranged in the first direction and a second direction different from the first direction. Angles formed between directions of optical axes of the plurality of illumination elements arranged in the second direction projected onto a first plane that includes a straight line in the first direction and a straight line in the second direction and the first direction become smaller as a position approaches a center portion of the plurality of illumination elements arranged in the second direction.

5 Claims, 5 Drawing Sheets

(51) Int. Cl.
  G06T 7/70 (2017.01)
  H04N 23/56 (2023.01)

(56) References Cited

U.S. PATENT DOCUMENTS

| | | | |
|---|---|---|---|
| 2015/0327935 A1* | 11/2015 | Coleman ................ | F16M 11/42 |
| | | | 211/85.13 |
| 2019/0259791 A1* | 8/2019 | Itsuji ...................... | H04N 23/55 |
| 2020/0249156 A1* | 8/2020 | Wu ........................ | G06N 20/00 |
| 2020/0296266 A1* | 9/2020 | Koyama ................ | H04N 23/90 |
| 2021/0116788 A1* | 4/2021 | Itsuji ...................... | H04N 23/56 |
| 2021/0281327 A1* | 9/2021 | Sato .................... | H04B 10/532 |

OTHER PUBLICATIONS

Japanese Office Action issued Jun. 17, 2025 during prosecution of related Japanese patent application No. 2021-164443. (English-language machine translation included).

* cited by examiner

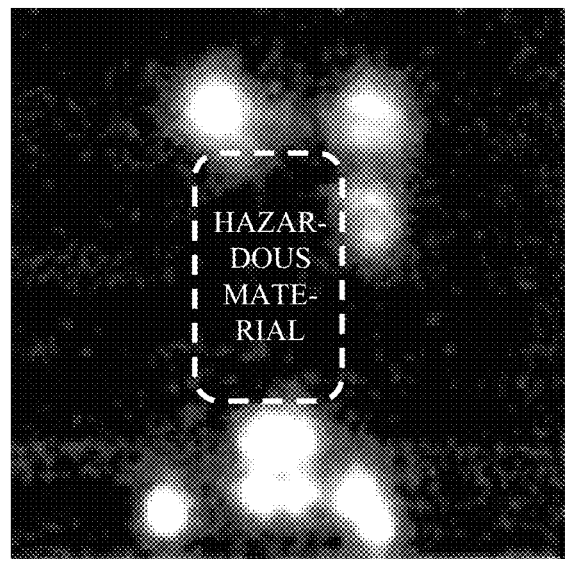
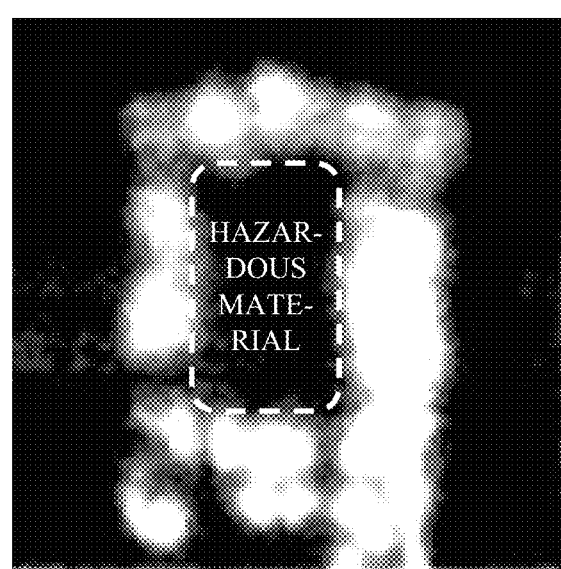
FIG. 3A                    FIG. 3B

PRIOR ART

CAMERA SYSTEM

BACKGROUND

Technical Field

The disclosure relates to a camera system using a terahertz wave.

Description of the Related Art

There has conventionally been proposed an inspection technology using the terahertz wave, which is defined as an electromagnetic wave having a frequency of 30 GHz or higher and 30 THz or lower. Japanese Patent Laid-Open No. ("JP") 2020-153974 discloses a camera system that includes an illumination unit configured to irradiate an inspection target with the terahertz wave, and a camera unit configured to capture an image formed by the terahertz wave reflected by the inspection target, in order to detect a hazardous material (dangerous substance).

The terahertz wave has a long wavelength and causes specular reflection on the surface of the inspection target. Therefore, in the camera system disclosed in JP 2020-153974, the terahertz wave emitted from the illumination unit enters the camera unit only if an illumination element included in the illumination unit, the surface of the inspection target, and the camera unit are in a positional relationship satisfying the law of reflection. In a case where the inspection target is, for example, a human body, which has an uneven shape on its surface and an elliptical shape that becomes more convex as a position approaches its center when viewed from the top, it is necessary to properly set the irradiation direction of the illumination element. However, the camera system disclosed in JP 2020-153974 has a low irradiation efficiency of the illumination unit and insufficient detection accuracy of the hazardous material because the irradiation direction of the illumination element is not set to follow the uneven shape of the human body.

SUMMARY

The disclosure provides a camera system with high detection accuracy of a hazardous material.

A camera system according to one aspect of the disclosure configured to inspect an inspection target moving in a first direction includes an illumination unit configured to irradiate the inspection target with a terahertz wave, and a camera unit disposed at a position which the terahertz wave reflected on the inspection target enters, and configured to acquire an image formed by the reflected terahertz wave. The illumination unit includes a plurality of illumination elements two-dimensionally arranged in a first direction and a second direction different from the first direction. Angles formed between directions of optical axes of the plurality of illumination elements arranged in the second direction, which are projected onto a first plane that includes a straight line in the first direction and a straight line in the second direction, and the first direction become smaller as a position approaches a center portion of the plurality of illumination elements arranged in the second direction.

A camera system according to another aspect of the disclosure configured to inspect an inspection target moving in a first direction includes an illumination unit configured to irradiate the inspection target with a terahertz wave, and a camera unit disposed at a position which the terahertz wave reflected on the inspection target enters, and configured to acquire an image formed by the reflected terahertz wave. The illumination unit includes a plurality of substrates arranged two-dimensionally in a first direction and a second direction different from the first direction, each of which drives at least one of a plurality of illumination elements. Angles formed between directions of optical axes of the plurality of illumination elements arranged in the second direction projected onto a first plane that includes a straight line in the first direction and a straight line in the second direction and the first direction become smaller as a position approaches a center portion of the plurality of illumination elements arranged in the second direction.

Further features of the disclosure will become apparent from the following description of exemplary embodiments with reference to the attached drawings.

BRIEF DESCRIPTION OF THE DRAWINGS

FIGS. 3A and 3B illustrate an image corresponding to a length of the illumination unit in a second direction.

DESCRIPTION OF THE EMBODIMENTS

Figure 1A:
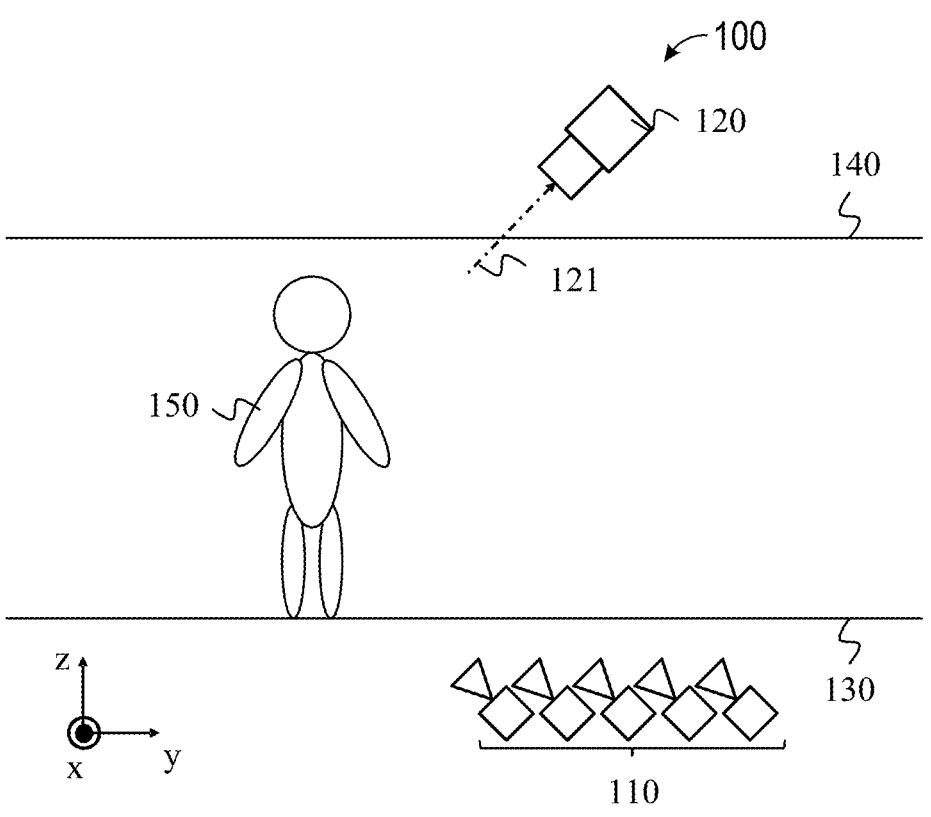
FIGS. 1A and 1B explain a configuration of a camera system according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

Figure 1B:
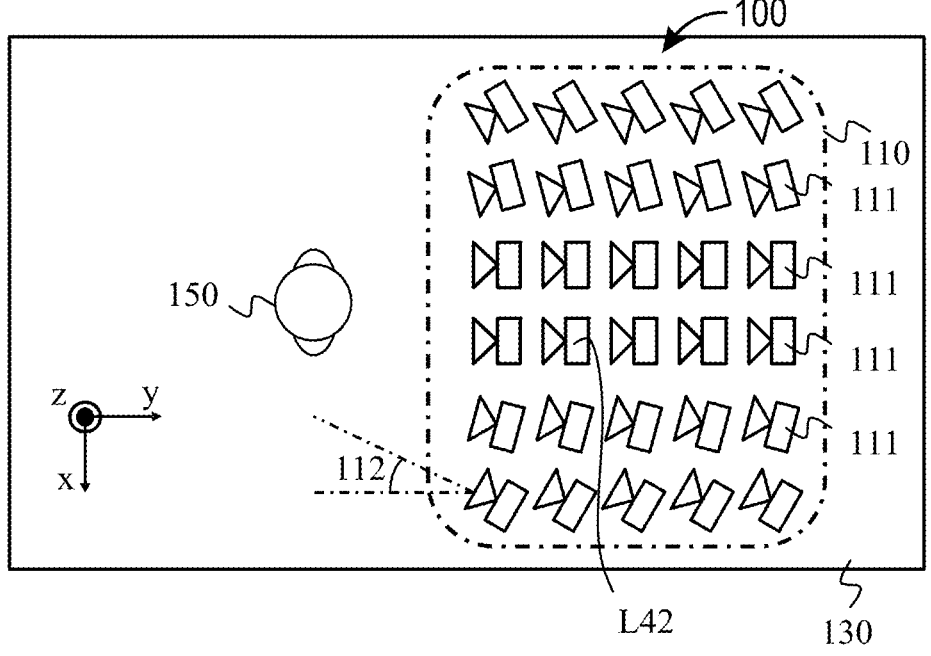

FIGS. 1A and 1B explain a configuration of a camera system 100 according to this embodiment. FIG. 1A is a side view of the camera system 100. FIG. 1B is a top view of the illumination unit 110. The camera system 100 includes an illumination unit 110 that irradiates an inspection target 150 with a terahertz wave, and a camera unit 120 disposed at a position which the terahertz wave reflected on the inspection target 150 enters and configured to acquire an image (terahertz image) formed by the reflected terahertz wave. In this embodiment, the illumination unit 110 is disposed under floor 130, and the camera unit 120 is disposed behind ceiling 140. The floor 130 and the ceiling 140 may be made of a member that transmits the terahertz wave, such as polyethylene.

The terahertz wave emitted from the illumination unit 110 is specularly reflected by the inspection target 150 and enters the camera unit 120. The inspection target 150 is usually a human, but may be an animal or a robot other than a human. Since the terahertz wave passes through a cloth or the like, an unillustrated processor connected to the camera system 100 can detect a hazardous material hidden under clothes based on an image acquired by the camera unit 120.

In the following description, a second direction is set to a direction orthogonal to an optical axis 121 of the camera unit 120, which is a direction of one of two straight lines orthogonal to each other included in a first plane orthogonal to a direction from the ceiling 140 to the floor 130, and a first direction is set to the other direction. A third direction is set to a direction orthogonal to the first direction and the second direction, and a second plane is set to a plane including a straight line in the second direction and a straight line in the third direction. In this embodiment, the first plane and the second plane are the XY plane and the YZ plane, respectively, and the first to third directions are a Y-axis direction, an X-axis direction, and a Z-axis direction, respectively. In this embodiment, a traveling direction of the inspection target 150 is set to the Y-axis direction.

In this embodiment, the illumination unit 110 and the camera unit 120 are disposed under the floor 130 and behind the ceiling 140, respectively, but this disclosure is not limited to this example. The illumination unit 110 may be disposed behind the ceiling 140, and the camera unit 120 may be disposed under the floor 130. The illumination unit 110 and the camera unit 120 may be disposed in sidewalls. Even in this case, as will be described later, it is necessary to properly set the irradiation direction of the illumination element.

The camera system 100 includes the single camera unit 120 in this embodiment, but may include a plurality of camera units 120 at different positions or with different imaging directions. Thereby, images in different imaging ranges and different imaging directions can be acquired, so that the detection accuracy of the hazardous material can be improved.

As illustrated in FIG. 1B, the illumination unit 110 includes a plurality of illumination elements 111 arranged two-dimensionally in the XY plane. In FIG. 1B, the plurality of illumination elements 111 are arranged in 6 rows in the X-axis direction and 5 columns in the Y-axis direction. Each of the plurality of illumination elements 111 is identified by a two-dimensional address. For example, an illumination element 111 at the fourth column from the top in the X-axis direction and the second row from the left in the Y-axis direction will be called L42. The plurality of illumination elements 111 include a plurality of first illumination elements arranged in the second direction and a second illumination element held between the plurality of first illumination elements. That is, the plurality of first illumination elements are arranged outside the second illumination element in the second direction.

Figure 5:
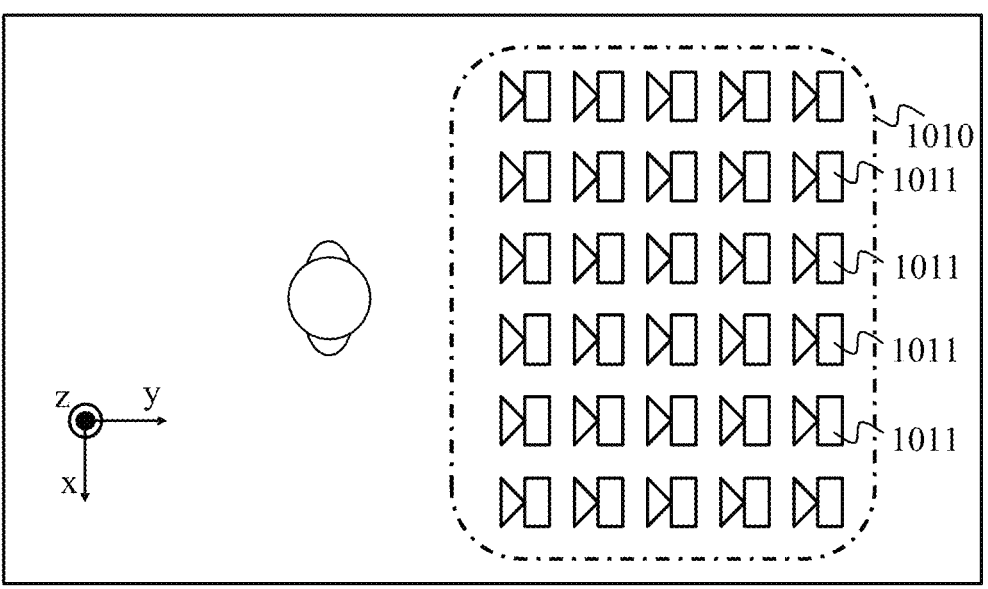
FIG. 5 is a top view of an illumination unit in a conventional camera system.

FIG. 5 is a top view of the illumination unit 1010 of the conventional camera system 1000. The illumination unit 1010 includes a plurality of illumination elements 1011 arranged two-dimensionally in the XY plane. All angles formed between directions of optical axes (illumination directions) of the plurality of illumination elements 1011 projected onto the XY plane and the Y-axis direction are equal to each other. In the case where the inspection target is, for example, a human body, which has an uneven shape on its surface and an elliptical shape that becomes more convex toward the center viewed from above, it is necessary to properly set an irradiation direction of each illumination element. In the configuration illustrated in FIG. 5, the irradiation directions of the plurality of illumination elements 1011 are not set to follow or handle the uneven shape of the human body, and thus the irradiation efficiency of the illumination unit 1010 is low and the detection accuracy of a hazardous material cannot made high.

In this embodiment, a plurality of substrates 113 are arranged so that angles formed between directions of optical axes (illumination direction) of the plurality of first illumination elements projected onto the first plane and the first direction can be larger than angles formed between directions of optical axes of the second illumination elements (illumination direction) projected onto the first plane and the first direction. That is, as a position approaches the center of a plurality of illumination elements arranged in the second direction, angles formed between the directions of the optical axes of the plurality of illumination elements projected onto the first plane and the first direction become smaller. Due to this configuration, each optical axis (irradiation direction) of the plurality of illumination elements 111 can follow or handle the uneven shape of the human body, improving the irradiation efficiency of the illumination unit 110 and the detection accuracy of the hazardous material.

More specifically, in FIG. 1B, angles 112 formed between directions of optical axes of the illumination elements L11 to L15 and L61 to L65 projected onto the XY plane and the Y-axis direction are larger than angles formed between directions of optical axes of the illumination elements L21 to L25 and L51 to L55 projected onto the XY plane and the Y-axis direction. Angles formed between directions of optical axes of the illumination elements L21 to L25 and L51 to L55 projected onto the XY plane and the Y-axis direction are larger than angles formed between directions of optical axes of the illumination elements L31 to L35 and L41 to L45 projected onto the XY plane and the Y-axis direction.

Figure 2:
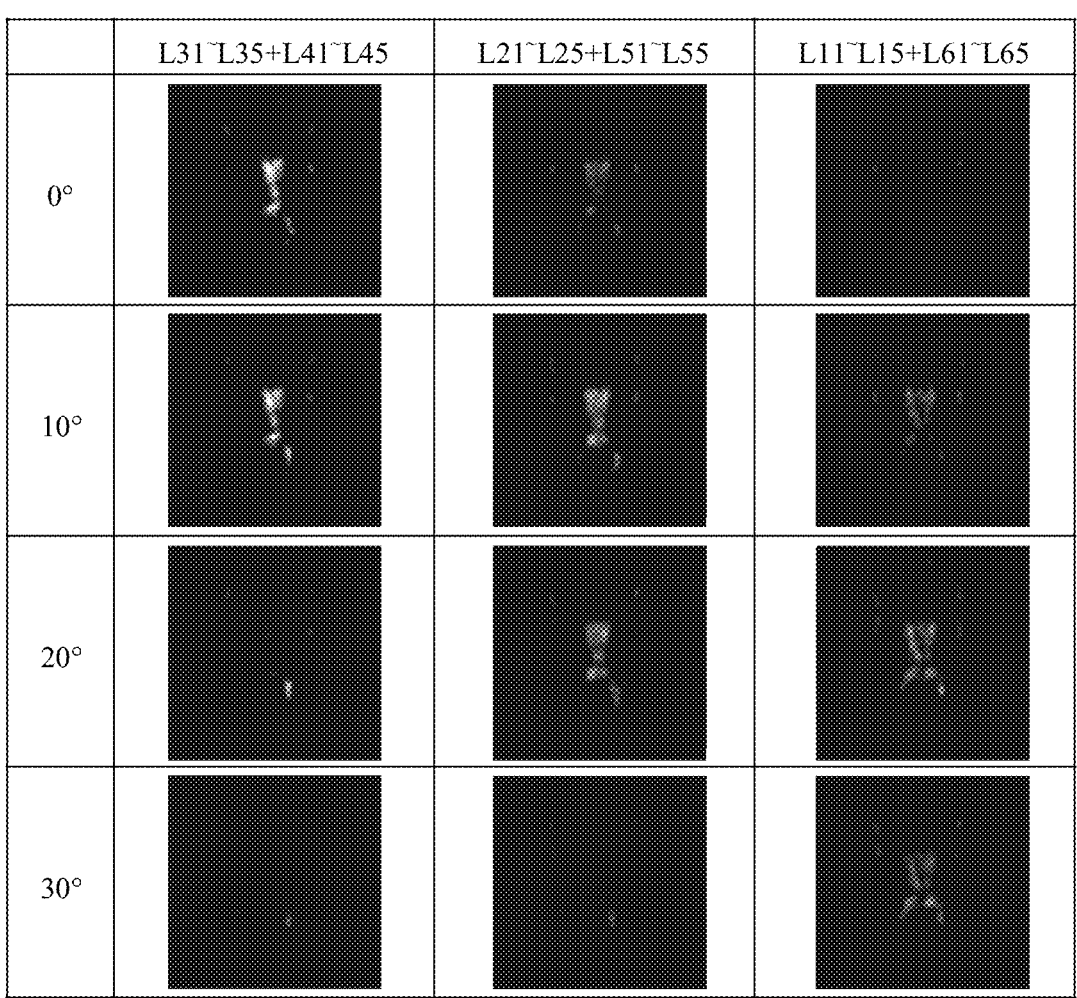
FIG. 2 illustrates an image acquired in a case where an optical axis of an illumination element is changed.

FIG. 2 illustrates images to be acquired by the camera unit 120 through ray tracing simulations with different angles 112 formed between the directions of the optical axes of the plurality of illumination elements 111 projected onto the XY plane and the Y-axis direction. The inspection target is a person. White portions in the images to be acquired by the camera unit 120 mean large luminance values. As illustrated in FIG. 2, the illumination elements L11 to L15 and L61 to L65 have low irradiation efficiencies at the angles 112 of 0 degrees formed between the directions of the optical axes projected onto the XY plane and the Y-axis direction, and hardly contribute to image formations using the terahertz wave. On the other hand, the illumination elements L11 to L15 and L61 to L65 have the highest irradiation efficiencies at the angles 112 of about 20 to 30 degrees formed between the direction in which each optical axis is projected onto the XY plane and the Y-axis direction. The illumination elements L31 to L35 and L41 to L45 have the highest illumination efficiencies at the angles of 0 degrees formed between the directions of the optical axes projected onto the XY plane and the Y-axis direction. That is, the configuration according to this embodiment can improve the irradiation efficiency of the illumination unit 110 and the detection accuracy of hazardous materials.

Conventionally, as a camera system that detects a hidden hazardous material using the terahertz wave, a body scanner type that requires a person as the inspection target to stop, and a walk-through type that does not require the person to stop. The body scanner type can provide a detailed inspection but requires people to stop. Therefore, the walk-through type is advantageous in throughput for places that are used for a large number of people, such as airports, concert venues, and stadiums.

The camera system 100 is supposed to be used as the walk-through type. Thus, the camera system 100 needs to irradiate a person moving in the Y-axis direction with the terahertz wave and to acquire images formed by the terahertz wave. Accordingly, in a case where it is assumed that one of the two illumination elements 111 arranged in the first direction is set to a third illumination element and the other is set to a fourth illumination element, an angle formed between a direction of an optical axis of the third illumination element projected onto the first plane and the first direction may be equal to an angle formed between a direction of an optical axis of the fourth illumination element projected onto the first plane and the first direction. That is, angles formed between the directions of the optical axes of the plurality of illumination elements arranged in the first direction projected onto the first plane and the first direction may be equal to each other. For example, in FIG. 1B, angles formed between the optical axes of the illumination elements L11 to L16 projected onto the first plane and the Y-axis direction may be equal to each other. These angles may differ according to the attachment accuracy and within an error range due to variation of the plurality of illumination elements 111. More specifically, if a difference between the angle formed between the direction of the optical axis of the third illumination element projected onto the first plane and the first direction and the angle formed between the direction of the optical axis of the fourth illumination element projected onto the first plane and the first direction is less than 5 degrees, these angles can be considered equal to each other.

Angles formed between the directions of the optical axes of the plurality of first illumination elements projected onto the second plane and the first direction may be equal to angles formed between the directions of the optical axes of the second illumination element projected onto the second plane and the first direction. More specifically, in FIGS. 1A and 1B, the angles formed between the directions of the optical axes of the illumination elements L11 to L15 and L61 to L65 projected onto the YZ plane and the Y-axis direction may be equal to the angles formed between the directions of the optical axes of the illumination elements L21 to L25 and L51 to L55 projected onto the YZ plane and the Y-axis direction.

More specifically, an angle formed between a direction of an optical axis of each of a plurality of illumination elements arranged in the second direction, which is projected onto the second plane, and the first direction may be a Brewster's angle in which reflectance of p-polarized light is 0. If the angle deviates from the Brewster's angle, for example, the reflection by clothes becomes strong, and it becomes difficult to detect the terahertz light reflected by the hazardous material hidden under the clothes. In a case where a person wears a thick coat, the Brewster's angle is about 50 degrees. Thus, the angle formed between the direction of the optical axis of each of the plurality of illumination elements arranged in the second direction, which is projected onto the second plane, and the first direction may be 40 degrees to 60 degrees inclusive.

In order to irradiate the entire hidden object with the terahertz wave, the length of the illumination unit 110 in the second direction may be equal to or larger than the width of the hidden object. The length of the illumination unit 110 in the second direction may be equal to or larger than the width of the inspection target 150. More specifically, in the case where a person is assumed as the inspection target 150, the length of the illumination unit 110 in the second direction may be 0.6 m or more, or 0.8 m or more.

FIGS. 3A and 3B illustrate images corresponding to the length of the illumination unit 110 in the second direction. FIG. 3A illustrates an image acquired in a case where the length of the illumination unit 110 in the second direction is equal to or longer than the width of the hidden object and less than the width of the inspection target 150. FIG. 3B illustrates an image acquired in a case where the length of the illumination unit 110 in the second direction is equal to or more than the width of the inspection target 150.

As illustrated in FIG. 3A, in the case where the length of the illumination unit 110 in the second direction is equal to or larger than the width of the hidden object, a difference can be detected between the terahertz wave specularly reflected by the hidden object and the terahertz wave specularly reflected by the inspection target 150 is observed. On the other hand, as illustrated in FIG. 3B, in the case where the length of the illumination unit 110 in the second direction is equal to or larger than the width of the inspection target 150, the entire width of the inspection target 150 can be irradiated by the terahertz wave. Therefore, a boundary line due to a difference in contrast between the hidden object and the inspection target 150 can be visually recognized. Thus, the detection accuracy of the hazardous material can be further improved.

Second Embodiment

This embodiment will discuss a configuration in which a plurality of illumination elements 111 are held and driven by using a substrate. This embodiment will discuss a configuration different from that of the first embodiment, and a detailed description of the common configuration to that of the first embodiment will be omitted.

Figure 4A:
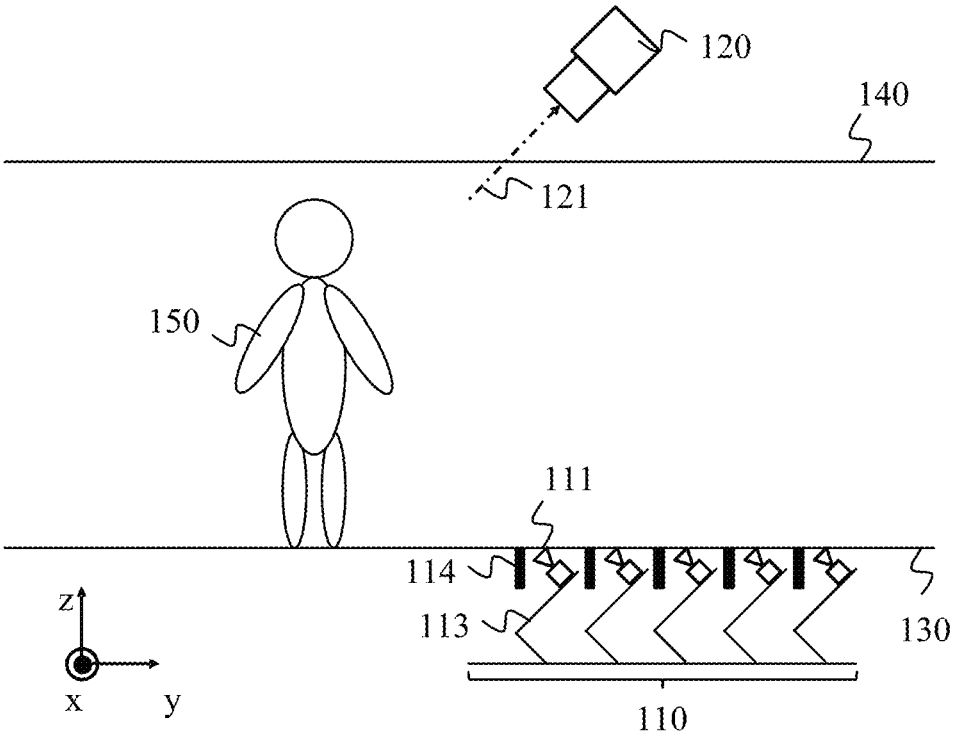
FIGS. 4A and 4B explain a configuration of a camera system according to a second embodiment.
Figure 4B:
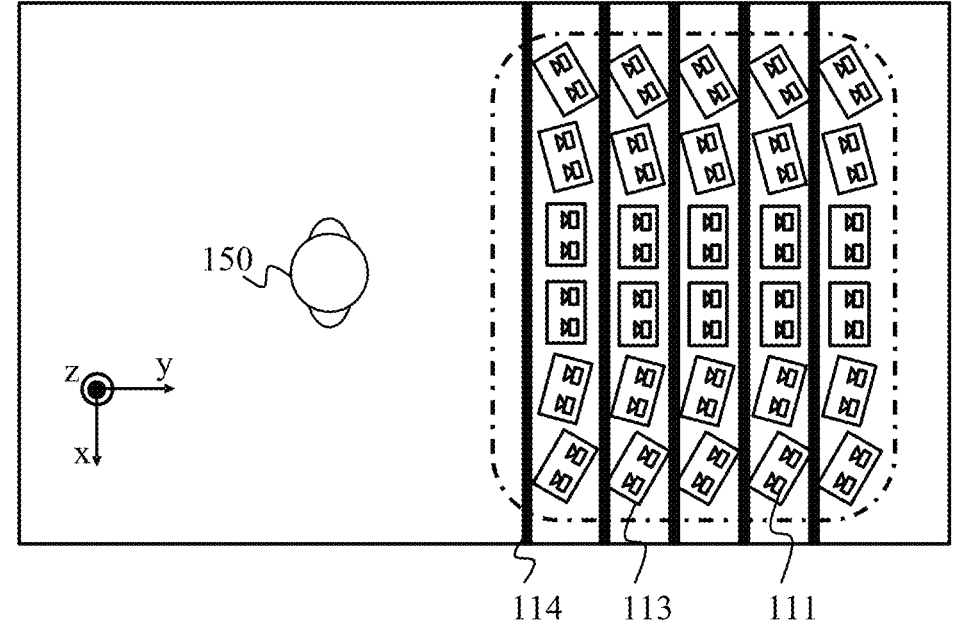

FIGS. 4A and 4B explain a configuration of a camera system according to a second embodiment. FIG. 4A is a side view of the camera system 100. FIG. 4B is a top view of the illumination unit 110.

The illumination unit 110 includes a plurality of substrates 113 arranged two-dimensionally in the XY plane. At least one illumination element 111 is mounted on each of the plurality of substrates 113. The plurality of substrates 113 include a plurality of first substrates and a second substrate held between the plurality of substrates arranged in the second direction. That is, the plurality of first substrates are disposed outside the second substrate in the second direction. In the plurality of substrates 113, an angle formed between a direction of each normal of the plurality of first substrates projected onto the first plane and the first direction is larger than an angle formed between a direction of the normal of the second substrate projected onto the first plane and the first direction. This configuration can coincide the optical axes of the plurality of illumination elements 111 with the uneven shape of the human body, and thus improve the irradiation efficiency of the illumination unit 110 and the detection accuracy of the hazardous material.

A plurality of pillars 114 are disposed among the plurality of substrates 113 in the X-axis direction. In FIGS. 4A and 4B, the terahertz wave is irradiated from a space between the pillars 114. A floor plate that allows terahertz waves to pass through can be placed on the pillars 114. That is, the pillars 114 are provided to maintain the strength of the floor 130. Disposing the plurality of substrates 113 between the plurality of pillars 114 in this way can efficiently irradiate the inspection target 150 with the terahertz wave through the plurality of illumination elements 111 while maintaining the strength of the floor 130.

Each embodiment can provide the camera system with high detection accuracy of a hazardous material.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-164443, filed on Oct. 6, 2021, which is hereby incorporated by reference herein in its entirety.

What is claimed is:

1. A camera system comprising:

an illumination unit configured to irradiate an inspection target, guided to move in a first direction, with a terahertz wave; and a camera unit disposed at a position which the terahertz wave reflected on the inspection target enters, and configured to acquire an image formed by the reflected terahertz wave, wherein the illumination unit includes a plurality of illumination elements two-dimensionally arranged along both the first direction, in which the inspection target moves, and a second direction different from the first direction, wherein the plurality of illumination elements arranged along the second direction have angles between the first direction and directions of the plurality of illumination elements to be smaller as positions of the plurality of illumination elements in the second direction approach a center portion of an arrangement area where the plurality of illumination elements are arranged, and wherein the directions of the plurality of illumination elements, which are arranged along the first direction and arranged at the same position in the second direction, are equal to each other.

2. The camera system according to claim 1, wherein the angles between directions of the plurality of illumination elements arranged in the second direction, which are projected onto a plane that includes a straight line in the second direction and a straight line in a third direction orthogonal to each of the first direction and the second direction, and the first direction range from 40 degrees to 60 degrees inclusive.

3. The camera system according to claim 1, wherein a length of the illumination unit in the second direction is 0.6 m or more.

4. A camera system comprising:

an illumination unit configured to irradiate an inspection target, guided to move in a first direction, with a terahertz wave; and a camera unit disposed at a position which the terahertz wave reflected on the inspection target enters, and configured to acquire an image formed by the reflected terahertz wave, wherein the illumination unit includes a plurality of substrates arranged two-dimensionally along both the first direction, in which the inspection target moves, and a second direction different from the first direction, each of which drives at least one of a plurality of illumination elements, wherein the plurality of illumination elements arranged along the second direction have angles between the first direction and directions of the plurality of illumination elements to be smaller as positions of the plurality of illumination elements in the second direction approach a center portion of an arrangement area where the plurality of illumination elements are arranged, and wherein the directions of the plurality of illumination elements, which are arranged along the first direction and arranged at the same position in the second direction, are equal to each other.

5. The camera system according to claim 4, further comprising pillars arranged in the second direction among the plurality of substrates.

* * * * *